United States Patent [19]

Ousborne

[11] Patent Number: 5,424,940
[45] Date of Patent: Jun. 13, 1995

[54] COMPUTER CONTROLLED SYSTEM PROVIDING FUNCTIONS WITHIN A LAUNDROMAT FACILITY

[76] Inventor: Jeffrey J. Ousborne, 5606 Foxview Ct., Clarksville, Md. 21029

[21] Appl. No.: 233,427

[22] Filed: Apr. 28, 1994

Related U.S. Application Data

[63] Continuation of Ser. No. 666,910, Mar. 11, 1991, abandoned, which is a continuation-in-part of Ser. No. 186,032, Apr. 25, 1988, Pat. No. 4,999,763.

[51] Int. Cl.⁶ .................. G06F 17/60; G06F 19/00
[52] U.S. Cl. .................. 364/140; 364/400; 364/479; 68/12.02; 340/825.35
[58] Field of Search .......... 364/140, 141, 478, 479, 364/400, 138, 139; 235/381; 68/12.01, 12.02, 12.08, 12.23, 13 R, 15, 16; 134/57 R, 58 R; 340/825.35; 194/217, 218

[56] References Cited

U.S. PATENT DOCUMENTS

| | | | |
|---|---|---|---|
| 4,216,461 | 8/1980 | Werth et al. | 364/479 X |
| 4,369,442 | 1/1983 | Werth et al. | 364/479 X |
| 4,412,292 | 10/1983 | Sedam et al. | 364/479 |
| 4,766,548 | 8/1988 | Cedrone et al. | 364/479 |
| 4,981,024 | 1/1991 | Beldham | 68/12.18 |

Primary Examiner—Joseph Ruggiero

[57] ABSTRACT

A computer controlled system providing accountability at a laundromat facility. The system includes a central computer and a plurality of washers/dryers, as well as one or more accessory vending machines. The vending machines and each washer and dryer or combination of washers and dryers includes a programmed microprocessor which controls access to the apparatus and interfaces with the central computer providing information to and receiving information from the central computer. An account generation site, via which a customer can communicate with the central computer is provided, as are an operator's terminal including a keypad, display and printer. Sensors for sensing temperatures, pressures and the like are operatively arranged to provide data inputs to the central computer. A remote operator terminal can be provided, modems being used, to effect communication with the central computer and the programmed microprocessors.

21 Claims, 6 Drawing Sheets

COMPUTER CONTROLLED SYSTEM PROVIDING FUNCTIONS WITHIN A LAUNDROMAT FACILITY

This application is a continuation of application Ser. No. 666,910, filed Mar. 11, 1991, now abandoned, which is a continuation-in-part of applicant's application Ser. No. 07/186,032, filed on Apr. 25, 1988, now U.S. Pat. No. 4,999,763, entitled "Self Service Access Controller" the disclosure of which is incorporated herein in its entirety by reference, and contains divisional subject matter from the earlier application.

FIELD OF INVENTION

The present invention is in the general field of service provided by equipment which is operated by the user. More specifically, the invention relates to those self service laundromat facilities at which the user currently obtains use of the equipment by depositing money for a specific service.

BACKGROUND OF THE INVENTION

The present invention relates to self service equipment generally found in laundromats and similar facilities. Typically, a customer receives access to the various apparatus such as a washer, dryer and other equipment in these facilities by depositing money into each particular apparatus. Once sufficient money is deposited, the customer receives a specific machine cycle from, for example, the washer, dryer or other equipment. Alternatively, he might purchase a product from a vending machine on the premise.

A typical laundromat comprises washers, dryers and dispensing machines. When the customer enters a sufficient amount of money to turn the apparatus on, it starts a machine cycle. In the case of a dryer a machine cycle is a specific drying time, for a washing machine it is a washing cycle, for a dispensing machine it is the dispensing of a product. The amount of money required to activate a machine cycle of the apparatus is preset at the money accumulator.

At some laundromats, the apparatuses are activated by tokens rather than money. In these instances the customer can purchase tokens from a dispensing machine or a facility operator. These tokens have a specific redemption value in the various apparatus in the facility. By depositing these tokens in a token acceptor at a particular apparatus, the customer receives a product or service. These tokens can activate the apparatus by mechanical or electronic means In addition to the accumulators and timers associated with each apparatus, there are typically mechanical or electronic counters on each apparatus in the facility to audit the total money and/or tokens deposited or the total number of cycles activated on each apparatus. The mechanical or electronic counters are typically overlaid onto the existing equipment. Since these counters are not required to operate the system, they can be disconnected, thereby defeating their intended purpose.

These presently available activation and monitoring systems have several drawbacks. First, the amount of money or number of tokens required to activate each apparatus must be manually preset at each accumulator individually. Second, in the case of a time cycle apparatus, the amount of time given for each activation must be manually preset at each timer individually. These timers do not allow price differentiation for the various services provided at a specific apparatus. Third, the audit counts used to verify that the operators are accurately collecting all of the money must be manually tabulated. These audit counts can also be defeated without disabling the laundromat service. Fourth, the owner/operator must manually tabulate statistical information on the use of various apparatus at the facility. Fifth, the operator must visit the facility to determine if operator service is required to repair broken equipment, refill chemicals, and remove or refill money and or tokens. Sixth, the money and or tokens are housed in each machine and they must be protected from theft or vandalism at each apparatus with a money vault or other protection device. The presence of the money at each site significantly increase the degree of vandalism and damage to these devices. Seventh, the facilities operator must collect the money and or tokens from each machine individual.

SUMMARY OF THE INVENTION

The principle object of the invention is to provide a computer controller system for effecting accountability in a laudromat facility.

The present invention provides for an improved access, control, accounting and monitoring system for a laundromat with multiple apparatus that are activated by the customer (self service). It provides a consolidated means to control the activation of each apparatus and interface with the customer, means to preset the amount of money or number of tokens to activate an apparatus, means to preset the amount of time given in a time cycle apparatus, means to change pricing and cycle times by time of day and or day of week, means to collect and record apparatus information (such as money deposited, time used of each function of an apparatus, usage of apparatus by time of day and sensor values used to measure items such as liquid levels of chemicals used on the facility, water pressure and temperature), means to store and process apparatus information and statistics, means to access this information and change system configuration from the centralized site or from a remote location away from the facilities, means for the system to automatically notify a remote site in the event that one or more of the aforementioned sensor values goes outside of the operator specified range, means to centralize the money collection to a limited number of sites by opening a customer account and providing to the customer an account authorization voucher in a printed, electronic or magnetic media and means for the customer to access specific apparatus on the facility with an account authorization device.

The novel features that are considered characteristic of the invention are set forth with particularity in the appended claims. The invention itself, however, both as to its organization and operation, together with other objects and advantages thereof is to be understood from the following description of an illustrative embodiment, when read in conjunction with the accompanying drawings.

DETAILED DESCRIPTION OF THE INVENTION

Figure 1:
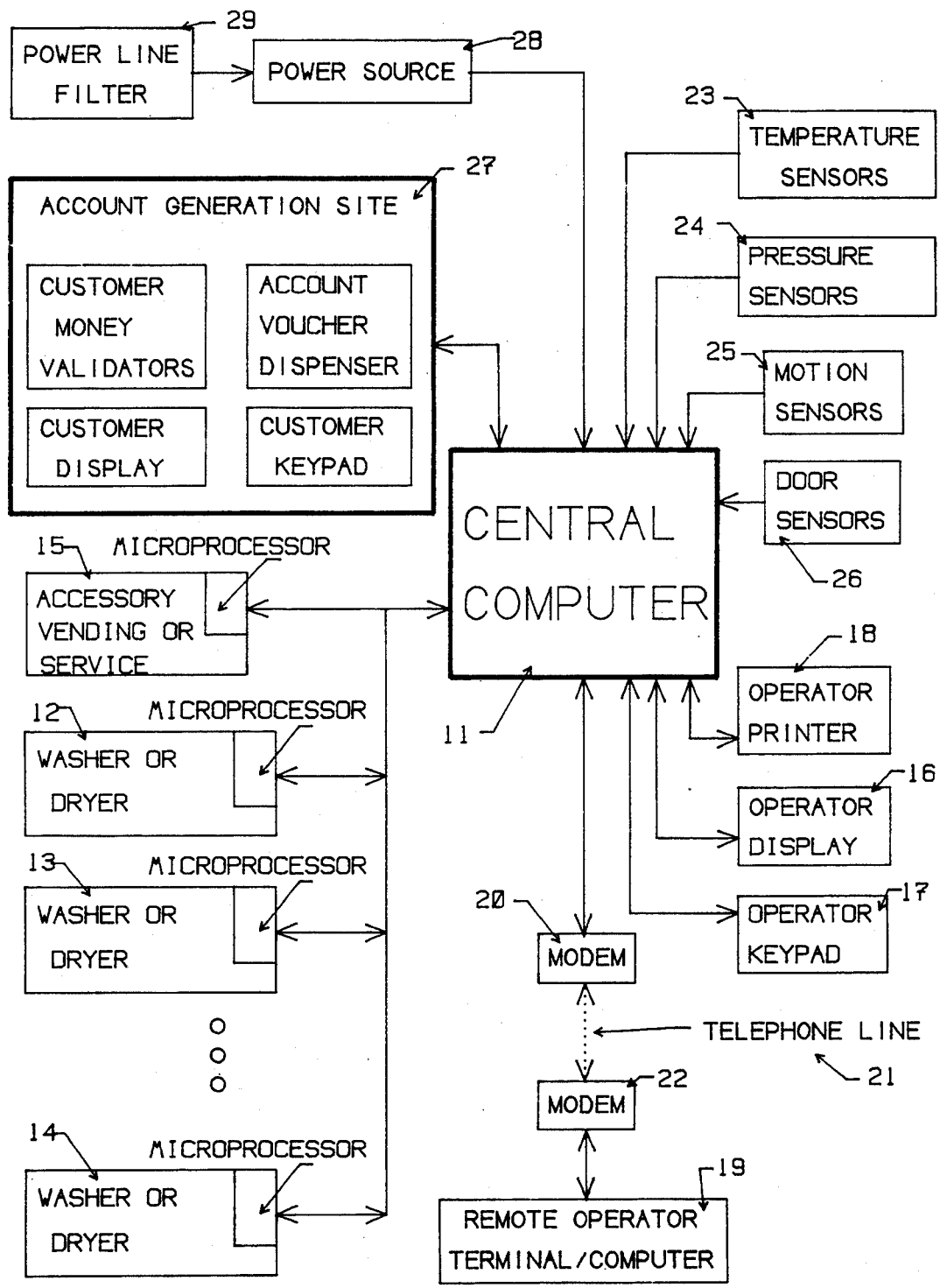
FIG. 1 is a schematic representation of an exemplary embodiment of a laundromat facility in accordance with the present invention.

As shown in FIG. 1, a preferred embodiment of the self service laundromat controller which may be used in practicing the present invention is shown. The controller may be realized as a central computer located in the equipment room of the facility communicating with a plurality of microprocessor controllers distributed throughout the facility and operatively arranged to control respective apparatus therein. The central computer 11 communicates with microprocessor controllers that control access to the laundromat washers 12-14, dryers 12-14 and accessory vending or service machines 15. Access to and modification of information contained in the central computer and microprocessor interface controllers of apparatus in the facility is provided by an on site operator station that includes a display 16, keypad 17 and printer 18 connected to the central computer. Access to and modification of this information may desirably be provided at any remote operator terminal/computer 19 via the modem 20 connected to both the central computer at the facility and a telephone line 21. The remote site operator station must be provided with a modem 22 connected to a computer or terminal and telephone line.

In addition to customer apparatus monitoring and control, the central computer desirably receives inputs from a plurality of sensors 23-26 located throughout the facility to detect any alarm conditions that might exist within the facility. These sensors include ambient facility room temperatures 23, hot water temperature 23, hot and cold water pressure 24, motion within the facility 25 and door open/closed status 26. The water temperature and pressure sensors are located in the equipment room of the facility. Room temperature and motion sensors are located in both the equipment room and the customer regions within the facility. The door open/closed sensors are located on the equipment room doors, entrance doors, bill changer doors and account generation site operator access doors.

When customer accounts are employed, several types of devices can be used to generate customer accounts at the account generation site 27. These accounts are generated at a limited number of sites. These sites include money validators, a customer display and keypad and account voucher dispenser. Money validators are used to accept customer currency. Customer information and instructions are displayed on a customer display. When customer selections are required the customer uses a customer keypad, typically a custom made membrane keypad. Several types of account vouchers are employed depending on the specific application. These can include printed, magnetic "credit card" type or electronic vouchers. The account printer, magnetic card encoders or electronic media are interfaced to the computer via a serial or parallel port. These accounts can have special discount pricing associated with them.

The central computer 11 is desirably supplied by a power source 28 which is coupled to an ac power line via a protective power line filter 29.

Figure 2:
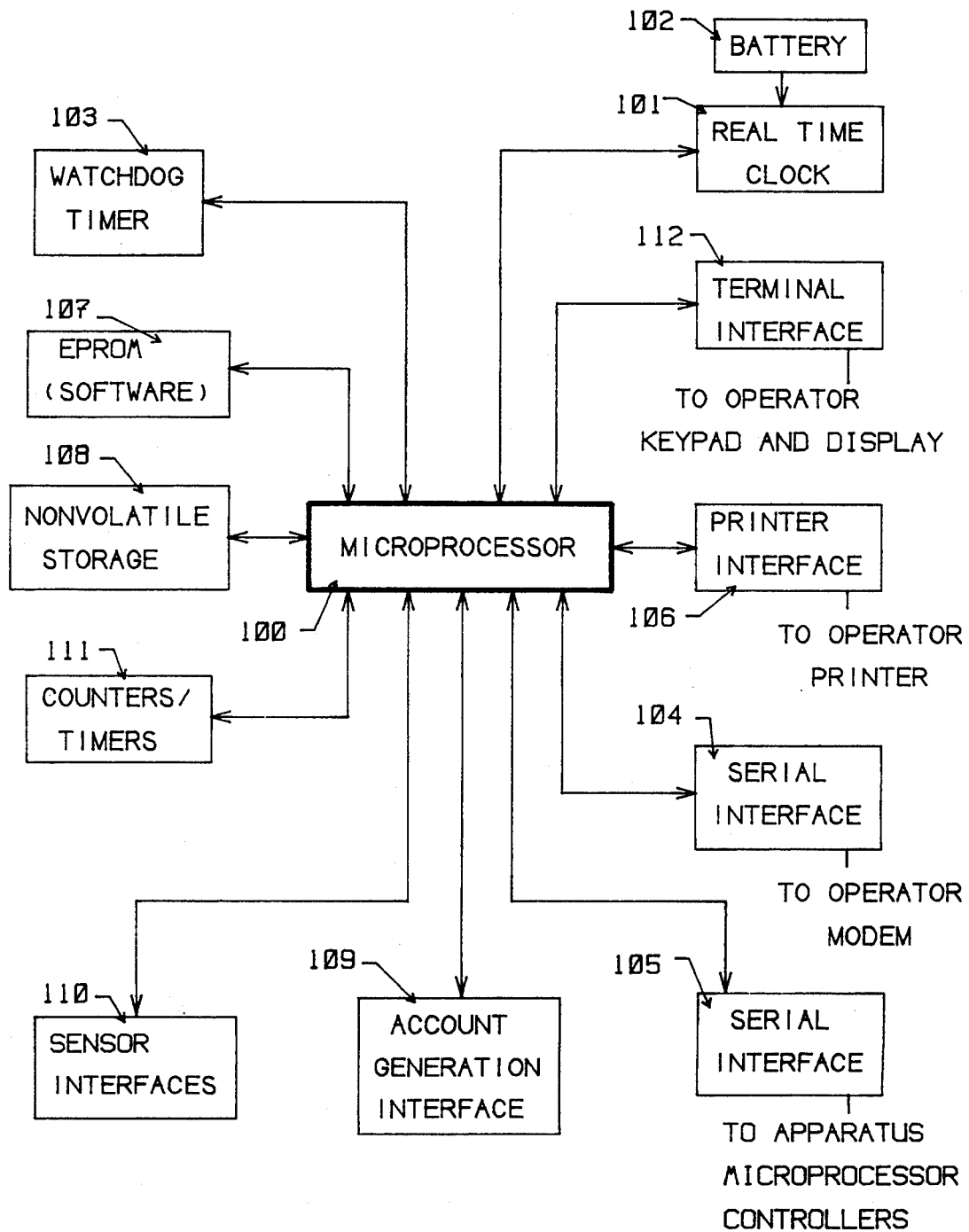
FIG. 2 is a schematic representation of the central computer used in the laundromat facility of FIG. 1.

A schematic illustration of the central computer is shown in FIG. 2 and is typically a housing containing a printed circuit board with a CMOS microprocessor 100 such as an Intel TM 80188, a real time clock 101 with a lithium battery backup 102 such as the Dallas Semiconductor TM DS1216D to continuously maintain time, a "watchdog" timer 103 such as the Dallas Semiconductor TM DS1232, one or more serial interfaces 104 and 105 and a parallel printer interface 106 such as the VLSI TM VL16C452. CMOS EPROMS 107 such as 27C512's containing the central computer control program are inserted in the printed circuit board along with nonvolatile storage 108. The nonvolatile storage is used to store apparatus accounting information and customer account information. The nonvolatile storage is a memory system that preserves the information contained in them during power loss. Generally, low power CMOS static RAMs with battery backup capability are used as nonvolatile storage. In this embodiment, the DS1216D provides the battery backup function for a static CMOS RAM such as the Hitachi TM HM628128.

The real time clock 101 is used during the automatic collection of time of day and day of week statistics and to automatically change any specials, pricing or facility operations that vary with time of day or day of week as specified by the operator. The "watchdog" timer 103 is used to automatically reset the microprocessor system if the microprocessor stops performing correctly. This provides for unattended capability.

In addition to and as a alternative to the nonvolatile RAM, EEPROMs are used to store system configuration information. Bubble memory is used to store and backup critical data such as the account information when accounts will be valid for extended periods of time. Digital cassette data cartridges or disks are used to record all transactions in the event of a need to reconstruct all transactions at the facility. The Bubble memory, data cartridges and EEPROMs are not required in general and any combination of them can be used as an alternative or supplement to the nonvolatile RAM.

One serial interface 104 with two Dallas Semiconductor TM DS1228 RS232 compatible drivers is used for communication via a modem and telephone line to a remote computer terminal or PC. When the remote site is activated by calling the facility computer and signing on with the correct password, that remote site can perform all of the functions that the terminal on the facility is capable of. In addition, this site can be automatically called and notified whenever sensor values are outside the operator defined normal operating ranges.

One or more serial interfaces 105 with National Semiconductor TM 75176 RS485 compatible drivers located in the central computer are used to communicate to apparatuses in the facility via a three wire network. The central computer 11 is the network manager and controls access to the network by all apparatuses 12-15. The central computer continually requests the status of the apparatuses and processes any requests from the apparatuses such as an account use authorization request. The RS485 drivers are limited to a maximum of 31 microprocessors communicating to the central computer on a single network. When more 31 microprocessors will be communicating to the central computer, additional serial interfaces with RS485 drivers are used in the central computer.

The central computer communicates to the account generation site 109 using a serial interface to the customer display, a serial or parallel interface to the account voucher dispenser depending on the voucher type, and I/O lines to the customer keypad and money validators. The serial and parallel ports are implemented with a single VLSI ™ VL16C452. An Intel ™ 8255 I/O buffer interfaces to the customer keypad. The same 8255 along with optical isolators and filters interface (109 and 110) to the money validators in the account generation site and sensors 23-26 at the facility.

Figure 3:
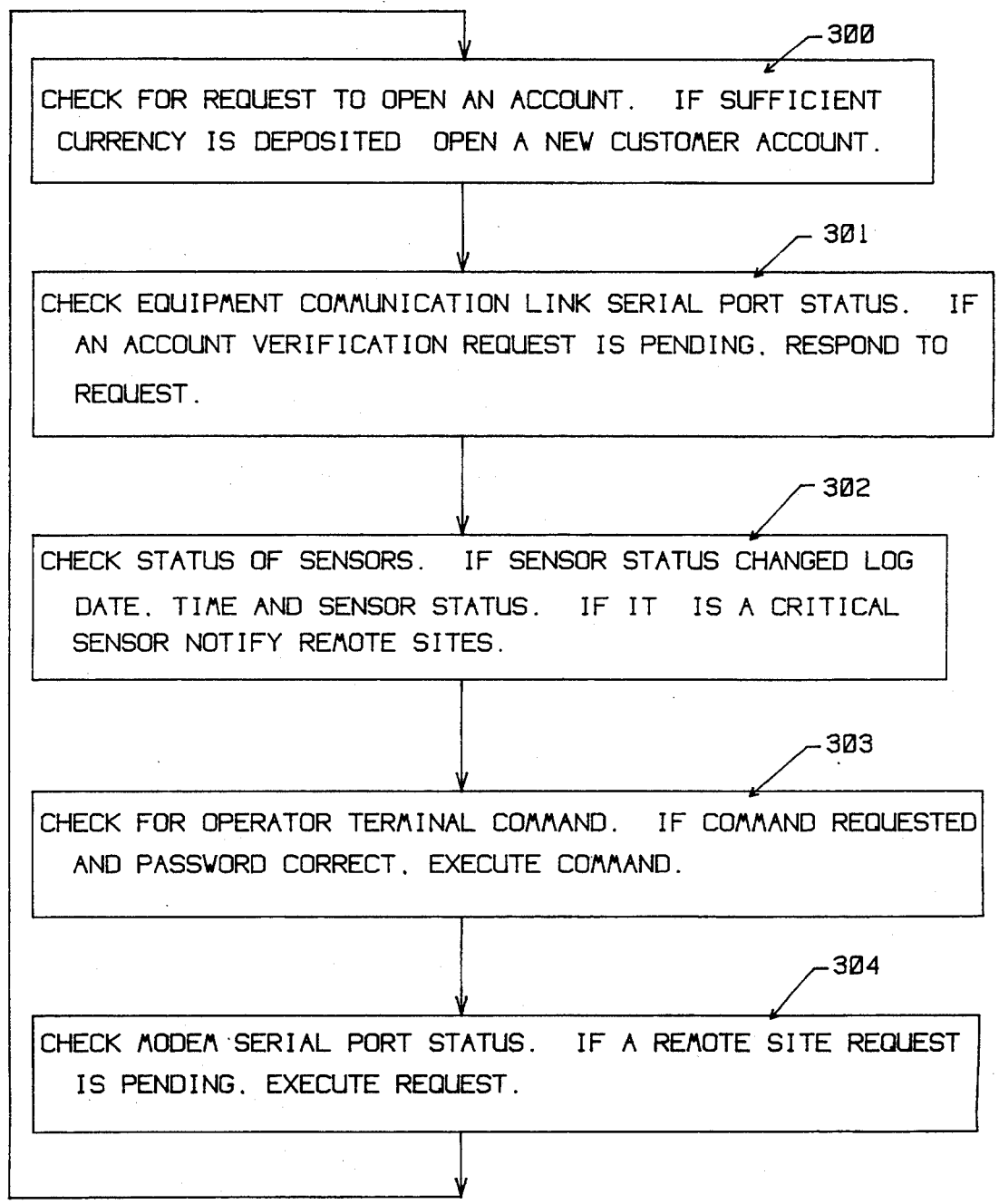
FIG. 3 is a flow chart useful in understanding the operations of the laundromat facility central computer of FIGS. 1 and 2.

A simplified general flow of the foreground program executed in the central computer illustrated in FIGS. 1 and 2 is shown in FIG. 3. The steps executed in each of the boxes in FIG. 3 is expanded in the following discussion.

Referring to 300, whenever money is deposited in an account generation site 27, an existing account is updated or a new account is opened. The customer account information is stored in the central computer. This information includes the account identification number, the time the account was opened, the value of the account at the time it was opened, its current value and history of use. The customer accounts can be used instead of or in combination with currency at specified apparatuses within the facility that is provided with an account validator.

Referring to 301, whenever account use authorization is requested from an apparatus 12-15, the account is verified to determine if sufficient funds are available to activate the apparatus. If so, the apparatus is notified that sufficient funds are available, and the account balance is reduced by the cost of that apparatus. When an operator specified number of sequential false accounts are entered, an alarm message is sent via the pager service.

Referring to 307 the status of each sensor 23-26 is checked routinely to determine if the sensor value is outside an operator specified range. The specified range is desirably a function of time of day and day of week. If it is outside this range an alarm condition exists and the central computer logs the time of the beginning and end of this alarm condition, logs sensor status and automatically notifies the operator and or service personnel via a standard pager service. The pager message includes information on the site identification number and status of all sensors at the site. The pager messages is repeated at an operator specified interval until the alarm conditions no longer exists.

Referring to 303 and 304, when a serial interrupt occurs for either the on site operator station or remote operator station, a check is made to determine what data or command has been issued. If a command is requested, the program presents the command options on the terminal and accepts appropriate responses. Prior to allowing access from the remote site, the remote site must first be authenticated. Two operator selected options are available. First, a password protection can be used or secondly, a call back scheme can be employed. In the call back scheme, the operator at the remote site calls the central computer 11 and enters a password at which point the central computer hangs up and dials an operator preset telephone number and allows access to the computer with password protection.

Referring to 303 and 304, the local and remote operator stations are used to centrally perform three types of command functions: 1) to continuously monitor all apparatus activities and sensors on the site (monitor mode), 2) to change system and apparatus configurations (setup mode), and 3) to review, print and reset audit counts and statistics (accounting mode). When the monitor mode is selected by the operator all customer activities comprising money, token or account entries are displayed along with apparatus status such as time left in a time cycle apparatus or time since last used. Additionally, sensor values such as water temperature/pressure are displayed. Warning notices are also displayed during the monitor mode for all sensor values that are outside operator defined ranges.

The setup mode allows the operator to change specific operating parameters of the total system and individual apparatus. System parameters comprise items such as setting system passwords, setting normal operating ranges for all system sensors and the telephone number(s) to call when specific sensor parameters exceed the normal operating range and setting a combination time of day and day of week general rate changes if any. Individual apparatus parameters comprise the amount of money or tokens required to activate an apparatus, time given for a single activation in a time cycle apparatus, time given (if any) for addition money or tokens deposited and availability of specific functions of that apparatus.

The accounting mode allows the operator to display or print audit reports. These reports include data on cash deposited, apparatus cycles, apparatus sensor information, customer account usage, when this option is present, and time usage data for each apparatus. These reports are available for each apparatus individually, summaries for each class of the apparatus and for all apparatus combined. The apparatus sensor information includes information on when specific apparatus doors, such as the service compartment and cash collection doors, where opened and when any apparatus failure alarms occurred. For example, a failure could occur if the apparatus stopped prior to the end of its cycle time. The time usage data would show how often the apparatus is being used during specific hours of the day and days of the week.

Figure 4:
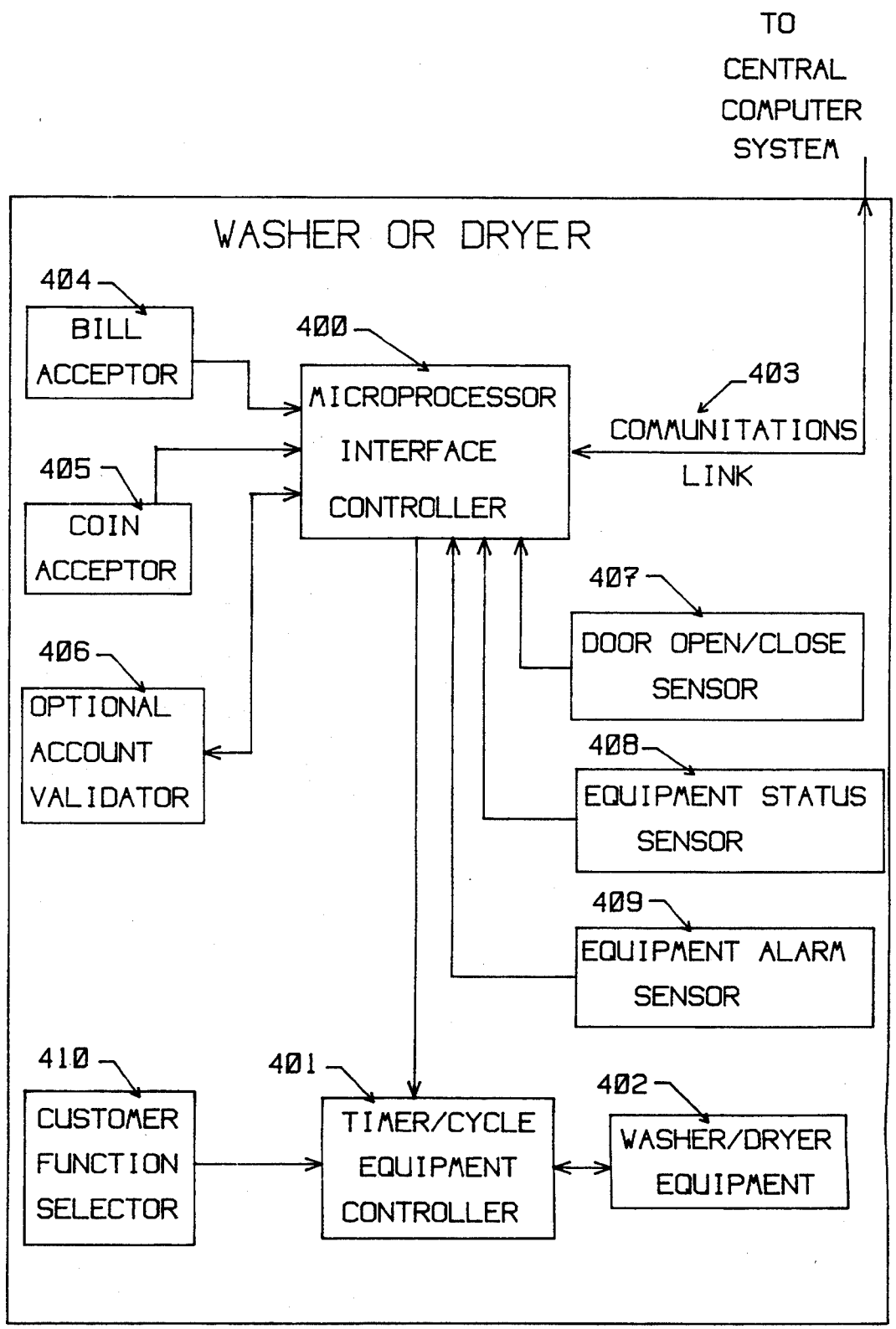
FIG. 4 is a schematic diagram of one of the washers and/or dryers of FIG. 1. showing its apparatus microprocessor interface controller and associated apparatus components.

Referring to FIG. 4, each washer, dryer, or combination of washers and dryers has a microprocessor interface controller 400. This microprocessor controls the activation of the washer/dryer/accessory equipment 401 and 402. The price to start and cycle times of the apparatus is controlled by 400. The operator presets the price and cycle times via the central computer 11 that communicates this setup information via the RS485 communication link 403 to the microprocessor interface controller 400 where it is stored. When a customer deposits coins and or bills in the acceptors 404 or 405, the microprocessor interface controller 400 accumulates the currency deposited and starts the apparatus cycle when sufficient currency has been deposited. If the optional account validator 406 is present, a customer can activate the apparatus by entering an account number with sufficient value to start the apparatus. The microprocessor interface controller 400 starts the apparatus cycle by activating the apparatus timer/cycle controller 401. In some apparatus the microprocessor interface controller 400 could perform the timer/cycle function (401) in addition to currency accumulation and apparatus activation.

As an illustrative example, the optional account validator 406 can be a custom membrane keypad to enter numeric account vouchers or a magnetic "credit card" type reader to read magnetic encoded account vouchers. A customer display that provides the customer with instructions and information can also be part of the optional account validation site at the apparatus or group of apparatus.

The microprocessor interface controller also interfaces to sensors 407-409 located in the apparatus. These sensors include equipment access door and cash access door status sensors 407, apparatus status sensors 408 such as the customer function selection 410 and apparatus cycle status and equipment alarm status 409.

Figure 5:
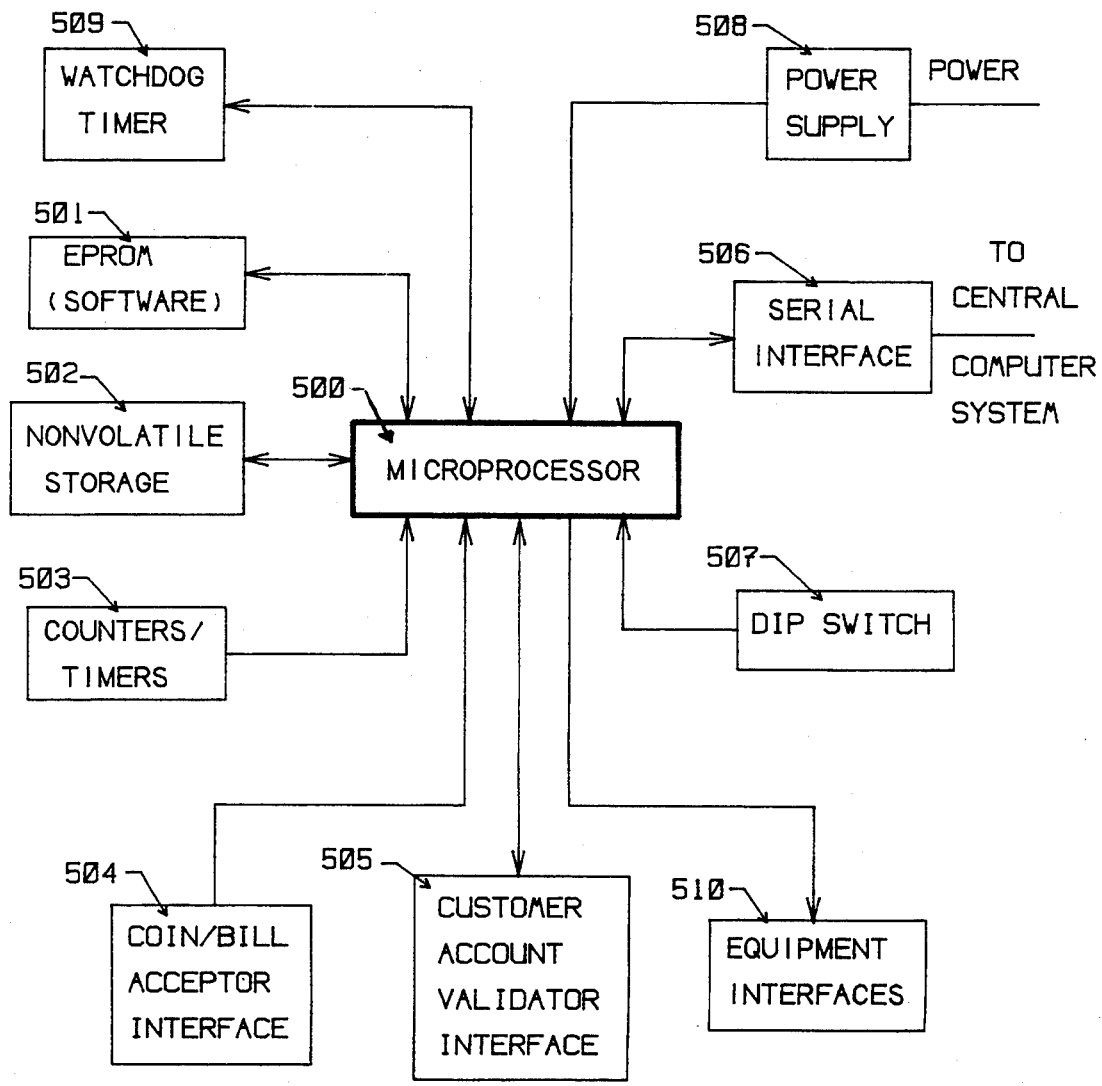
FIG. 5 is a schematic illustration of the components of the equipment microprocessor interface controller of FIG. 4.

A more detailed diagram of the microprocessor interface controller 400 is shown in FIG. 5. A microprocessor 500 such as the Intel TM 8031 executes the software stored in EPROM 501. Pricing, cycle times, accounting, and time usage history data are stored in nonvolatile memory storage 502. The nonvolatile storage consists of battery backed static RAM such as a Dallas Semiconductor TM DS1216C and Hitachi TM HM6264 and/or EEPROM. This information is updated whenever the operator requests a setup change and whenever customer activity occurs. The counter/timers 503 that are incorporated in the Intel 8031 are used to debounce the coin and bill acceptor outputs connected to the coin/bill acceptor interfaces 504 and a customer account keypad connected to the customer account validator interface 505. Additionally, the counter/timers 503 are used to time the transmission and reception of serial data to and from the central computer. The serial interface 506 includes RS485 interface drivers such as the National Semiconductor TM DS75176. This interface connects the microprocessor interface controller 400 to the communications link 403. The dip switch 507 is used to set a unique address for each microprocessor 12-15 at the facility communicating on the communications link 403. The RS485 drivers used in the serial interface allow many microprocessor interface controllers to communicate to the central computer on the same communications link 403 wires. This greatly simplifies system installation. The microprocessor 5 volt power 508 is generated from a switching regulator such as the SGS TM L4960 coupled to an ac power line desirable via a protective power line filter. The microprocessor start up and power shutdown is controlled by a watchdog timer 509 such as a Dallas Semiconductors TM DS1232 that incorporates microprocessor reset functions.

As shown in FIG. 5 the microprocessor is interfaced 504 to cash acceptors with optically isolated sensing modules consisting of a diode bridge, filter, and optically isolated driver such as 4N25s. The microprocessor is interfaced 510 to the apparatus equipment with triac drivers and triacs. The microprocessor interface controller can also include the customer account entry device interface 505. Depending on the specific account voucher type, this can be implemented with an Intel TM 8255 I/O buffer/driver to scan and decode entries on a matrix encoded keypad, a serial/parallel interface such as a National Semiconductor TM 8250 to a magnetic card reader or an electronic key device and a serial or parallel interface to a customer display such as an IEE TM 3601-95.

Figure 6:
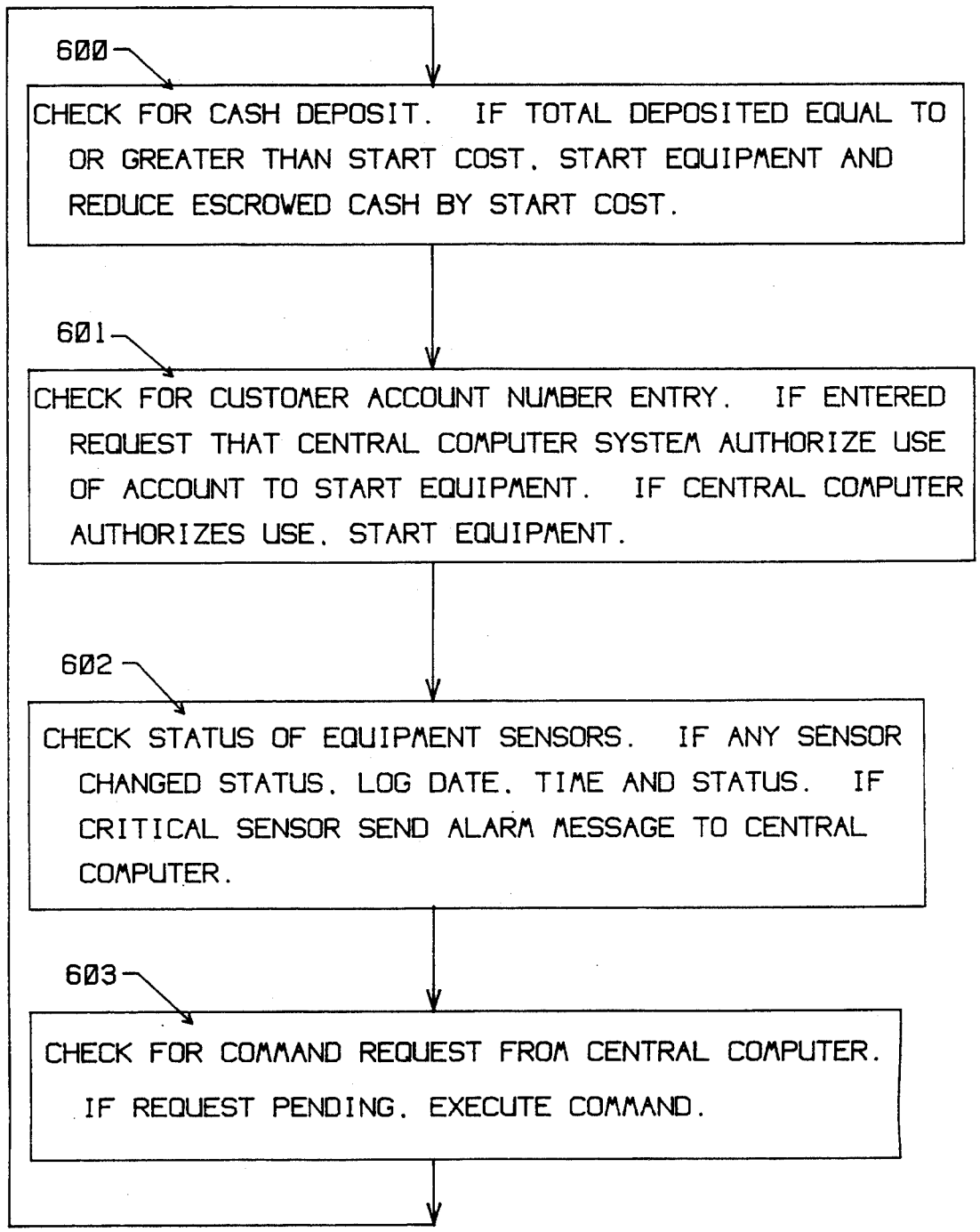
FIG. 6 is a flow chart useful in understanding the operation of the equipment microprocessor interface controller illustrated in FIGS. 4 and 5.

A simplified general flow of the foreground program executed in the microprocessor illustrated in FIGS. 4 and 5 is shown in FIG. 6. In addition to the foreground program, program steps are also executed whenever specific interrupts occur. Interrupts are generated by serial interface activity 506 and timer/counters 503 that are incorporated in the 8031. The steps executed in each of the boxes 600-603 in FIG. 6 is expanded in the following discussion along with a discussion of the program steps executed when interrupts occur.

Referring to 600, whenever a timer interrupt occurs the money and token acceptors are scanned. If money or a token deposit in an apparatus acceptor 404 or 405 is detected, the program increments the current and audit money and token counts. When the current money or token count reaches the operator preset value to start the apparatus, the apparatus is activated. If it is a time cycle apparatus, the operator specified cycle time is loaded into that apparatus time counter. At that point the current money or token counts are reduced by the start cost. If money or tokens are entered while the apparatus is activated, an operator preset amount of time is added to the apparatus cycle time counter.

Referring to 601, whenever a timer interrupt occurs the customer account entry keypads are also scanned when the particular embodiment uses a alphanumeric keypad for a customer account validator 406. If a key is detected, it is decoded and stored in a keypad buffer. When the entire customer account identification code is entered, it is checked against valid account codes by sending an account authorization message to the central computer 11 via the communications link 403. If the central computer's response to the account authorization message specifies that the account has sufficient credit to start the apparatus, the apparatus is activated by pulsing the timer/cycle equipment controller 401. If it is a time cycle apparatus, the operator specified cycle time is loaded into that apparatus time counter. At that point the keypad buffer is cleared. If an invalid account or account with insufficient funds is entered, a false code entry signal (long buzzer) is activated at the apparatus.

The timer interrupt is also used to generate a one second interval. At each one second interval the program decrements the apparatus cycle time counter. When the apparatus time counter reaches zero, the apparatus is turned off by the microprocessor interface controller 400 or by the timer/cycle equipment controller 401. At each 1 second interval while the apparatus is activated, the program increments the time usage counter for each particular function of an apparatus as well as the total time usage counter.

Referring to 602, whenever a timer interrupt occurs all apparatus sensors 407-409 are scanned to determine their status. If any status changes, the sensor status and date and time of change are recorded in the apparatus history data. If a specific sensor that has been preset by the operator to be an alarm sensor changes status, the apparatus sends a sensor status warning message to the central computer via the communications link 403.

Referring to 603, whenever a serial port interrupt occurs, the microprocessor check to determine if serial receive data is pending or if more serial data must be transmitted. If serial receive data is pending it is put in the serial input buffer. The serial input buffer is then routinely checked to determine if a command or request has been made by the central computer. If a command, such as price setting or audit count reset command, has been made, that command is executed. If a request, such as an audit report request or current status, is made the requested information is sent to the central computer.

It is to be understood that the foregoing detailed description and accompanying illustrations have been set out by way of example, not by way of limitation. Numerous other embodiments and variants are possible, without departing from the spirit and scope of the invention, its scope being defined in the appended claims.

What is claimed:

1. A computer controlled system providing customer access to, control and monitoring of self service apparatuses providing functions within a laundromat facility, the system comprising:
   a plurality of apparatuses within the laundromat facility for providing specific respective laundromat functions;
   programmable computer means;
   means for storing and retrieving data in nonvolatile storage coupled to the computer means;
   at least one validating means for accepting and validating respective customers' payments;
   means for providing customer account information to respective customers;
   means, including program means in said computer means, for opening respective customers' accounts and generating respective customers' accounts;
   means, including program means in said computer means, to authenticate respective accounts at a site within the facility wherein the authenticated account is used to access various ones of the apparatuses; and
   means coupled to said computer means and responsive to signals therefrom for activating respective ones of the apparatuses.

2. The computer controlled system of claim 1, wherein said means for opening and generating respective customers' accounts includes means for generating and issuing to respective customers respective vouchers.

3. The computer controlled system of claim 1, including means for presetting cost to activate each of the apparatuses.

4. The computer controlled system of claim 1, further comprising means for controlling period of time given to each activation of a time cycle for at least one of the apparatuses, and means to preset length of the period of time.

5. The computer controlled system of claim 1, further comprising means for presetting an automatic change of cost to activate at least some of the apparatuses as a function of day of week.

6. The computer controlled system of claim 1, further comprising means for presetting an automatic change of cost to activate at least some of the apparatuses as a function of the time of day.

7. The computer controlled system of claim 1, further comprising means for storing and reviewing usage statistics of the apparatuses and financial transaction information.

8. The computer controlled system of claim 1, including sensing means for monitoring water temperature within at least one of the apparatuses.

9. The computer controlled system of claim 1, including sensing means for monitoring pressure within at least one of the apparatuses.

10. The computer controlled system of claim 1, further comprising means for monitoring at least one operating parameter within the laundromat facility, and means for automatically notifying at least one remote site whenever the operating parameter is outside of an operator preset range.

11. The computer controlled system of claim 1, further comprising means for sensing computer means malfunction and restoring normal operations of the computer means.

12. The computer controlled system of claim 1, further comprising a communications link from said facility to and from a remote location.

13. The computer controlled system of claim 12, wherein said communications link includes a telephone line and comprises a pair of modems connected via the telephone line.

14. A computer controlled system providing customer access to, control and monitoring of self service apparatuses providing functions within a laundromat facility, the system comprising:
   a plurality of apparatuses within the laundromat facility for providing specific respective laundromat functions;
   programmable computer means;
   means for storing and retrieving data in nonvolatile storage coupled to the computer means;
   at least one means, for accepting and validating respective customers' payments;
   means responsive to signals from said means for accepting and validating said customers payments, for opening and modifying the customers' accounts, and for storing account information in said nonvolatile storage means; and
   means, including program means in said computer means, to authenticate respective accounts at a site within the facility wherein the authenticated account is used to access various ones of the apparatuses.

15. The computer controlled system of claim 14, wherein said means for opening and modifying the customers' accounts includes means for generating and issuing to respective customers respective vouchers.

16. The computer controlled system of claim 14, further comprising means for storing and reviewing usage statistics of the apparatuses and financial transaction information.

17. The computer controlled system of claim 14, further comprising a communications link which includes a telephone line and comprises a pair of modems connected via the telephone line.

18. The computer controlled system of claim 17, including means coupled to the computer means and responsive to signals therefrom for activating respective ones of the apparatuses.

19. A computer controlled system providing customer access to, control and monitoring of self service apparatuses providing functions within a laundromat facility, the system comprising:
   a plurality of apparatuses within the laundromat facility for providing specific respective laundromat functions;
   programmable computer means;
   means for storing and retrieving data in nonvolatile storage coupled to the computer means;
   at least one validating means for accepting and validating respective customers' payments;
   means for providing customer account information to respective customers;
   means, including program means in said computer means, for opening respective customers accounts and generating respective customers' accounts;

means, including program means in said computer means, to authenticate respective accounts at a site within the facility wherein the authenticated account is used to access various ones of the apparatuses;

means for monitoring operating parameters and functions of the apparatuses;

means, including program means in the computer means, for maintaining and storing customer account information and information relating to operating parameters and functions of the apparatuses; and means for extracting from the computer means customer account information and information relating to operating parameters and functions of the apparatuses.

20. The computer controlled system of claim 19, further comprising a communications link from said facility to and from a remote location.

21. A computer controlled system providing customer access to, control and monitoring of self service apparatuses providing functions within a laundromat facility, the system comprising:

a plurality of apparatuses within the laundromat facility for providing specific respective laundromat functions;

programmable computer means;

means for storing and retrieving data in nonvolatile storage coupled to the computer means;

at least one validating means for accepting and validating respective customers' payments;

means for providing customer account information to respective customers;

means, including program means in said computer means, for opening respective customers' accounts and generating respective customers' accounts; and means, including program means in said computer means, to authenticate respective accounts at a site within the facility wherein the authenticated account is used to access various ones of the apparatuses.

* * * * *